United States Patent
Song et al.

(10) Patent No.: US 11,914,813 B2
(45) Date of Patent: Feb. 27, 2024

(54) RANGING METHOD AND APPARATUS THEREOF, STORAGE MEDIUM, AND TERMINAL DEVICE

(71) Applicant: HUIZHOU TCL MOBILE COMMUNICATION CO., LTD, Guangdong (CN)

(72) Inventors: Bin Song, Guangdong (CN); Hailong Chen, Guangdong (CN); Junting Liu, Guangdong (CN); Yan Gong, Guangdong (CN)

(73) Assignee: HUIZHOU TCL MOBILE COMMUNICATION CO., LTD, Guangdong (CN)

( * ) Notice: Subject to any disclaimer, the term of this patent is extended or adjusted under 35 U.S.C. 154(b) by 0 days.

(21) Appl. No.: 17/757,221

(22) PCT Filed: Feb. 21, 2020

(86) PCT No.: PCT/CN2020/076242
§ 371 (c)(1),
(2) Date: Jun. 10, 2022

(87) PCT Pub. No.: WO2021/114478
PCT Pub. Date: Jun. 17, 2021

(65) Prior Publication Data
US 2023/0004273 A1    Jan. 5, 2023

(30) Foreign Application Priority Data
Dec. 12, 2019   (CN) .......................... 201911270742.5

(51) Int. Cl.
*G06F 3/041*    (2006.01)
*G06F 3/044*    (2006.01)

(52) U.S. Cl.
CPC .......... *G06F 3/04166* (2019.05); *G06F 3/044* (2013.01); *G06F 2203/04101* (2013.01)

(58) Field of Classification Search
CPC ................ G06F 3/044; G06F 3/04166; G06F 2203/04101; G06F 9/545
See application file for complete search history.

(56) References Cited

U.S. PATENT DOCUMENTS

| 2006/0241794 A1 | 10/2006 | Burkatovsky |
| 2014/0210490 A1 | 7/2014 | Hayakawa et al. |

(Continued)

FOREIGN PATENT DOCUMENTS

| CN | 102289321 A | 12/2011 |
| CN | 102662524 A | 9/2012 |

(Continued)

OTHER PUBLICATIONS

International Search Report in International application No. PCT/CN2021/076242, dated Sep. 23, 2020.

(Continued)

*Primary Examiner* — Hong Zhou
(74) *Attorney, Agent, or Firm* — PV IP PC; Wei Te Chung; Zhigang Ma (57) ABSTRACT

A ranging method and an apparatus thereof, a storage medium, and a terminal device. By adding a processing unit into a hardware abstraction layer of the terminal device, a software method is thus used to replace a physical proximity sensor (Psensor); in addition, costs are effectively reduced.

15 Claims, 3 Drawing Sheets

(56) References Cited

U.S. PATENT DOCUMENTS

| | | | | |
|---|---|---|---|---|
| 2014/0267025 | A1* | 9/2014 | Kim | G06F 3/04886 |
| | | | | 345/156 |
| 2014/0306903 | A1* | 10/2014 | Huang | G06F 11/3409 |
| | | | | 345/173 |
| 2015/0346900 | A1* | 12/2015 | Wang | H03K 17/955 |
| | | | | 345/174 |
| 2016/0154494 | A1* | 6/2016 | Kim | G06F 3/011 |
| | | | | 345/175 |
| 2016/0291788 | A1* | 10/2016 | Johansson | G06F 3/04883 |
| 2017/0185212 | A1* | 6/2017 | Jeong | G06F 3/0412 |
| 2018/0348994 | A1 | 12/2018 | Kitabayashi | |
| 2018/0364865 | A1* | 12/2018 | Li | G06F 3/04883 |
| 2020/0264657 | A1* | 8/2020 | Lee | G06F 1/1616 |

FOREIGN PATENT DOCUMENTS

| | | | |
|---|---|---|---|
| CN | 103442134 | A | 12/2013 |
| CN | 103841263 | A | 6/2014 |
| CN | 103870085 | A | 6/2014 |
| CN | 104063088 | A | 9/2014 |
| CN | 104133576 | A | 11/2014 |
| CN | 106339123 | A | 1/2017 |

OTHER PUBLICATIONS

Written Opinion of the International Search Authority in International application No. PCT/CN2021/076242, dated Sep. 23, 2020.
Chinese Office Action issued in corresponding Chinese Patent Application No. 201911270742.5 dated Nov. 4, 2020, pp. 1-6.

* cited by examiner

RANGING METHOD AND APPARATUS THEREOF, STORAGE MEDIUM, AND TERMINAL DEVICE

CROSS-REFERENCE TO RELATED APPLICATION

This application is a US national phase application based upon an International Application No. PCT/CN2020/076242, filed on Feb. 21, 2020, which claims priority to Chinese Patent Application No. 201911270742.5, entitled "RANGING METHOD AND APPARATUS THEREOF, STORAGE MEDIUM, AND TERMINAL DEVICE ", filed on Dec. 12, 2019, the disclosure of which is incorporated herein by reference in its entirety.

FIELD OF THE DISCLOSURE

The present application relates to the field of computer technology, and more specifically, to a ranging method and an apparatus thereof, a storage medium, and a terminal device.

BACKGROUND

A general capacitive touch panel (CTP) simulates a proximity sensor (Psensor) by calling an interface of the Psensor in a driver for CTP to register a virtual Psensor device. The CTP can report an approaching or departing status through the interface of the Psensor.

A driver of the proximity sensor is built in a separate Digital Signal Processor (DSP) on the Qualcomm platform after a terminal device uses an MSM8960 chip, so that a normal operation of the sensor in a low power mode will be realized. In this case, there is no direct communication between the driver for the CTP and the driver for the Psensor, and thus the approaching or departing status cannot be reported.

Therefore, a new technology is urgently needed to solve a problem of communication between the driver for the CTP and the driver for the Psensor.

SUMMARY

Technical Problem

The present application provides a ranging method and an apparatus thereof, a storage medium, and a terminal device, which can effectively solve problems that a conventional driver for CTP and a driver for Psensor cannot communicate directly and distance events cannot be reported.

Technical Solutions

According to an aspect of the present application, an embodiment of the present application provides a ranging method, which is applicable to a terminal device. The method comprises the following steps: enabling a capacitive touch panel (CTP) of the terminal device through a capacitive touch panel driving module in a kernel system of the terminal device; sending an enabling instruction to a proximity sensor (Psensor) driving module provided in a digital signal processor of the terminal device; receiving a distance event sent by the Psensor driving module; and acquiring distance information of an object and the CTP through the CTP driving module.

Further, after the step of enabling the CTP of the terminal device through the CTP driving module, the method further comprises a step of: receiving a ranging request.

Further, after the step of sending the enabling instruction to the Psensor driving module provided in the digital signal processor of the terminal device and before the step of receiving the distance event sent by the Psensor driving module, the method further comprises steps of: detecting the distance event by the CTP; and sending an interrupt signal to the CTP driving module by the CTP.

Further, after the step of sending the interrupt signal to the CTP driving module by the CTP, the method further comprises: sending a pulse signal having a preset duration to the Psensor driving module by the CTP driving module.

Further, the preset duration is 1 ms-20 ms.

Further, after the step of acquiring distance information of the object and the CTP through the CTP driving module, the method further comprises: reporting a determination result to the terminal device according to the distance information.

According to another aspect of the present application, an embodiment of the present application provides a ranging apparatus, and the ranging apparatus comprises: a capacitive touch panel enabling unit configured to enable a capacitive touch panel (CTP) through a capacitive touch panel driving module in a kernel system of a terminal device; a proximity sensor driving module enabling unit connected to the CTP enabling unit, and the proximity sensor driving module enabling unit is configured to send an enabling instruction to a proximity sensor (Psensor) driving module provided in a digital signal processor of the terminal device; a distance event receiving unit connected to the Psensor driving module enabling unit and configured to receive a distance event sent by the Psensor driving module; and a distance information acquiring unit connected to the distance event receiving unit and configured to acquire distance information of an object and the CTP through the CTP driving module.

Further, the ranging apparatus further comprises: a ranging request unit, connected to the CTP enabling unit and configured to receive the ranging request, and a distance information reporting unit, connected to the distance information acquiring unit and configured to report a determination result to the terminal device according to the distance information.

According to another aspect of the present application, an embodiment of the present application provides a computer-readable storage medium, wherein a plurality of instructions are stored in the storage medium, and the instructions are adapted to be loaded by a processor to execute the ranging method, the ranging method comprises: enabling a capacitive touch panel (CTP) of the terminal device through a capacitive touch panel driving module in a kernel system of a terminal device, wherein the CTP driving module is controlled by a CTP driving program; sending an enabling instruction to a proximity sensor (Psensor) driving module provided in a digital signal processor of the terminal device, wherein the Psensor driving module is controlled by a Psensor driving program; receiving a distance event sent by the Psensor driving module; and acquiring distance information of an object and the CTP through the CTP driving module.

Further, after the step of enabling the CTP of the terminal device through the CTP driving module, the method further comprises a step of: receiving a ranging request.

Further, after the step of sending the enabling instruction to the Psensor driving module provided in the digital signal processor of the terminal device and before the step of receiving the distance event sent by the Psensor driving module, the method further comprises steps of: detecting the distance event by the CTP; and sending an interrupt signal to the CTP driving module by the CTP.

Further, after the step of sending the interrupt signal to the CTP driving module by the CTP, the method further comprises: sending a pulse signal having a preset duration to the Psensor driving module by the CTP driving module.

Further, the preset duration is 1 ms-20 ms.

According to another aspect of the present application, an embodiment of the present application provides a terminal device, including a processor and a memory, the processor is electrically connected to the memory, the memory is configured to store instructions and data, and the processor is configured to implement the steps in the ranging method, and the ranging method comprises the following steps: enabling a capacitive touch panel (CTP) of the terminal device through a capacitive touch panel driving module in a kernel system of a terminal device, wherein the CTP driving module is controlled by a CTP driving program; sending an enabling instruction to a proximity sensor (Psensor) driving module provided in a digital signal processor of the terminal device, wherein the Psensor driving module is controlled by a Psensor driving program; receiving a distance event sent by the Psensor driving module; and acquiring distance information of an object and the CTP through the CTP driving module.

Further, after the step of enabling the CTP of the terminal device through the CTP driving module, the method further comprises a step of: receiving a ranging request.

Further, after the step of sending the enabling instruction to the Psensor driving module provided in the digital signal processor of the terminal device and before the step of receiving the distance event sent by the Psensor driving module, the method further comprises steps of: detecting the distance event by the CTP; and sending an interrupt signal to the CTP driving module by the CTP.

Further, after the step of sending the interrupt signal to the CTP driving module by the CTP, the method further comprises: sending a pulse signal having a preset duration to the Psensor driving module by the CTP driving module.

Further, the preset duration is 1 ms-20 ms.

Advantages of the Present Disclosure

The advantage of the present application is that, by adding a processing unit to the hardware abstraction layer of the terminal device, the present application is used for establishing a communication channel between the capacitive touch panel driving module in the kernel system of the terminal device and the proximity sensor driving module in the digital signal processor of the terminal device. In addition, the terminal device also adds an external interrupt signal, so that the Psensor driving module provided in the digital signal processor of the terminal device can send a distance event in time, thereby replacing a physical Psensor with a software method and effectively reducing costs.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DETAILED DESCRIPTION

The following clearly and completely describes the technical solutions in the embodiments of this disclosure with reference to the accompanying drawings in the embodiments of this disclosure. Apparently, the described embodiments are some of the embodiments of this disclosure rather than all of the embodiments. All other embodiments obtained by a person skilled in the art based on the embodiments of this disclosure without creative efforts shall fall within the protection scope of this disclosure.

In the description of the present application, it is to be understood that terms such as "center", "longitudinal", "lateral", "length", "width", "thickness", "upper", "lower", "front", "back", "left", "right", "vertical", "horizontal", "top", "bottom", "inner", "outer", "clockwise", "counter-clockwise", "axial", "radial", "circumferential" should be construed to refer to the orientation as then described or as shown in the drawings under discussion. These relative terms are for convenience of description only and do not require that the present application be constructed or operated in a particular orientation. Accordingly, this disclosure should not therefore be construed as a limitation on the present application.

In addition, terms such as "first" and "second" are used herein for purposes of description and are intended to indicate or imply relative importance or significance or to imply the number of indicated technical features. Thus, the feature defined with "first", "second" may explicitly or implicitly include at least one of the features. Furthermore, in the description of the present application, "multiple" means at least two, such as two, three, etc., unless clearly specified otherwise.

Figure 1:
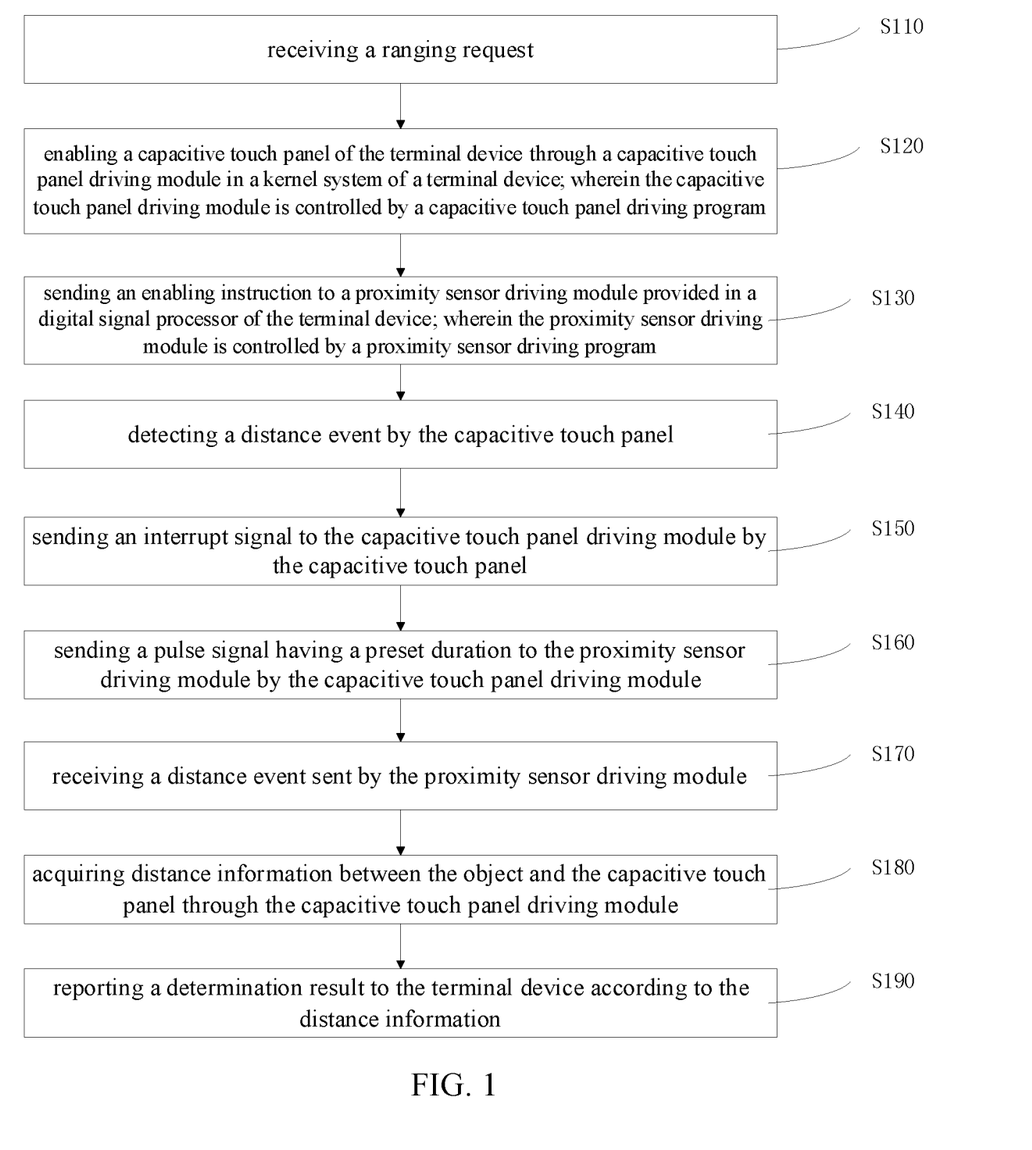
FIG. 1 is a flowchart of steps of a ranging method provided by an embodiment of the present application.

As shown in FIG. 1, a ranging method provided by an embodiment of the present application includes following steps:

Step S110: receiving a ranging request.

An operating system of a terminal device sends a ranging request to a hardware abstraction layer 10 of the terminal device. The hardware abstraction layer 10 of the terminal device is disposed between an operating system kernel of the terminal device and a hardware circuit of the terminal device. A function of the hardware abstraction layer 10 of the terminal device is to abstract the hardware (that is, a hardware is virtualized into corresponding functional units). At present, the operating system kernel of the terminal device is typically divided into the operating system kernel for Android and the operating system kernel for IOS (APPLE). The hardware circuit mainly is a connecting circuit between one hardware and another hardware of the terminal device.

Step S120: enabling a capacitive touch panel (CTP) of the terminal device through a capacitive touch panel driving module in a kernel system (Kernel) of the terminal device.

Step S130: sending an enabling instruction to a proximity sensor (Psensor) driving module provided in a digital signal processor (DSP) of the terminal device.

In step S120 and step S130, after receiving the ranging request, the hardware abstraction layer 10 will respectively enable the capacitive touch panel of the terminal device and the proximity sensor driving module provided in the digital signal processor of the terminal device. The capacitive touch panel will switch to a working mode after receiving the enabling instruction. The digital signal processor is configured to detect continuous analog signals.

Step S140: detecting a distance event by the capacitive touch panel.

The capacitive touch panel determines a result of distance event detected and generates distance information according to a current movement state of an object. The distance information includes approaching information and departing information between the object and the capacitive touch panel.

Step S150: sending an interrupt signal to the capacitive touch panel driving module by the capacitive touch panel.

In step S150, the capacitive touch panel will also send the interrupt signal to the capacitive touch panel driving module in the kernel system at this time. The interrupt signal is used to interrupt a program currently being processed by the capacitive touch panel driving module, so that the capacitive touch panel driving module executes step S160. Therefore, the interrupt signal allows the capacitive touch panel driving module to execute information provided in Step S160 in a timely manner.

Step S160: sending a pulse signal having a preset duration to the proximity sensor driving module by the capacitive touch panel driving module.

After the capacitive touch panel driving module receives the interrupt signal, the capacitive touch panel driving module sends the pulse signal having the preset duration to the proximity sensor driving module, and the preset duration is 1 ms-20 ms. In an embodiment, the preset duration is 10 ms, but not limited thereto. In other embodiments, the preset duration may also be 15 ms or 20 ms.

Step S170: receiving a distance event sent by the proximity sensor driving module.

After the proximity sensor driving module receives the pulse signal, the proximity sensor driving module will send the distance event to the hardware abstraction layer 10 of the terminal device.

Step S180: acquiring distance information between the object and the capacitive touch panel through the capacitive touch panel driving module.

After receiving the distance event, the hardware abstraction layer 10 of the terminal device will acquire the distance information between the object and the capacitive touch panel through the capacitive touch panel driving module.

Under collective action of step S120, step S130, step S170, and step S180, it is possible to effectively solve the problem that direct communication between the driver for CTP and the driver for Psensor in the prior art is not possible, and to realize the establishment of a communication channel between the capacitive touch panel driving module in the kernel system of the terminal device and the proximity sensor driving module provided in the digital signal processor of the terminal device.

Step S190: reporting a determination result to the terminal device according to the distance information.

The hardware abstraction layer 10 of the terminal device reports the determination result to the terminal device according to the distance information.

An advantage of the present application is that, by adding a processing unit to the hardware abstraction layer of the terminal device, the present application is used for establishing a communication channel between the capacitive touch panel driving module in the kernel system of the terminal device and the proximity sensor driving module in the digital signal processor of the terminal device. In addition, the terminal device also adds an external interrupt signal, so that the proximity sensor driving module provided in the digital signal processor of the terminal device can send a distance event in time. The present application can realize the replacement of the physical proximity sensor with the software method through the foregoing structural design and implementation of the steps, thereby effectively reducing costs.

Figure 2:
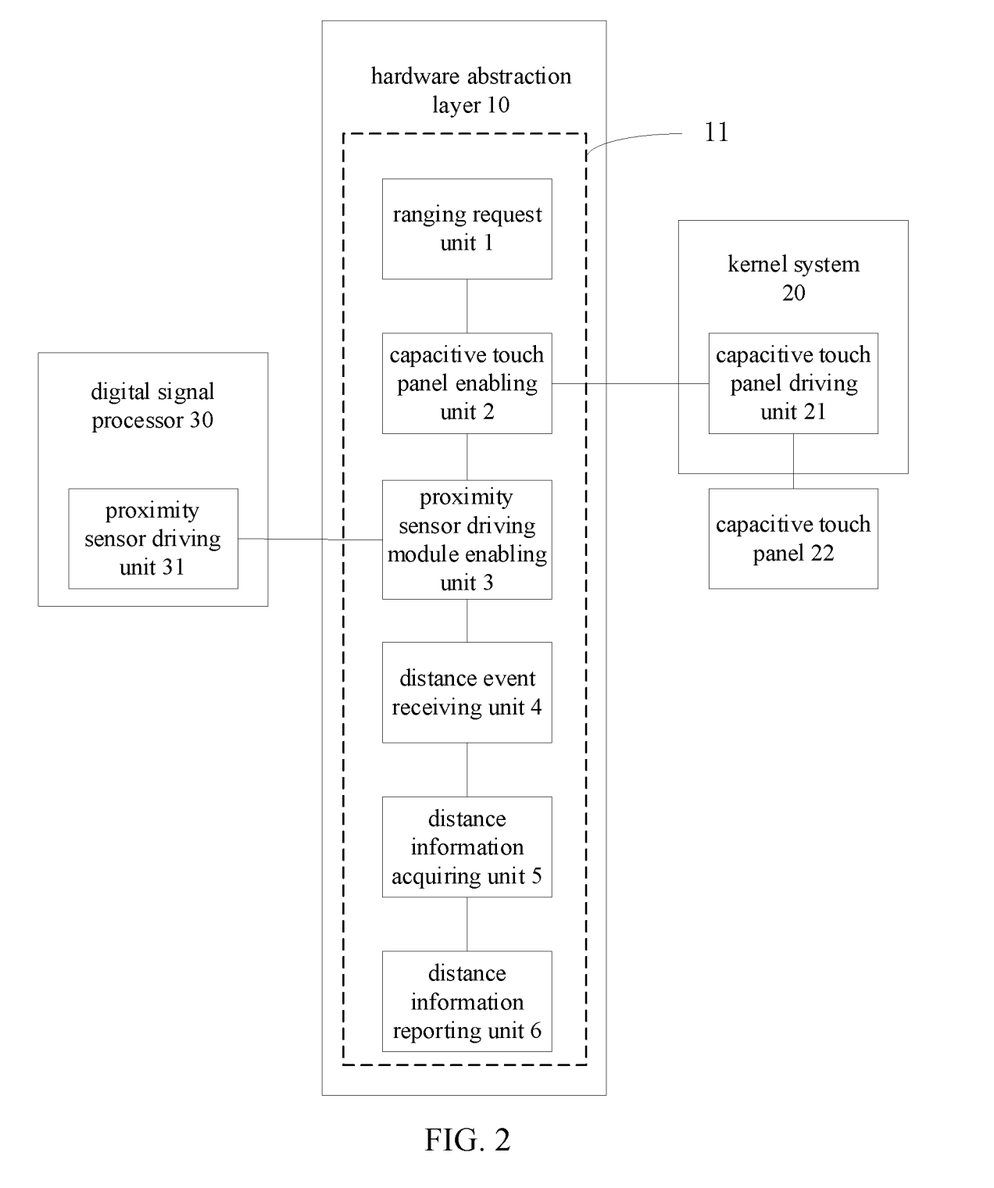
FIG. 2 is a schematic structural diagram of a ranging apparatus provided by an embodiment of the present application.

As shown in FIG. 2, which is a schematic structural diagram of a ranging apparatus provided by an embodiment of the disclosure, the ranging apparatus includes: a ranging request unit 1, a capacitive touch panel enabling unit 2, a proximity sensor driving module enabling unit 3, a distance event receiving unit 4, a distance information acquiring unit 5, a distance information reporting unit 6, a capacitive touch panel driving unit 21, a capacitive touch panel 22, and a proximity sensor driving unit 31.

The ranging request unit 1, the capacitive touch panel enabling unit 2, the proximity sensor driving module enabling unit 3, the distance event receiving unit 4, the distance information acquiring unit 5, and the distance information reporting unit 6 are disposed in the hardware abstraction layer 10. The hardware abstraction layer 10 of the terminal device is disposed between the operating system kernel of the terminal device and the hardware circuit of the terminal device. The function of the hardware abstraction layer 10 of the terminal device is to abstract the hardware.

In this embodiment, a processing unit 11 is provided in the hardware abstraction layer 10 of the terminal device, and the processing unit includes: the ranging request unit 1, the capacitive touch panel enabling unit 2, the proximity sensor driving module enabling unit 3, the distance event receiving unit 4, the distance information acquiring unit 5, and the distance information reporting unit 6. In this application, the processing unit is added to the hardware abstraction layer of the terminal device to establish the communication channel between the capacitive touch panel driving module in the kernel system of the terminal device and the proximity sensor driving module provided in the digital signal processor of the terminal device.

The ranging request unit 1 is connected to the capacitive touch panel enabling unit 2, and the ranging request unit 1 is configured to receive a ranging request. The operating system of the terminal device sends a ranging request to the ranging request unit 1 in the hardware abstraction layer 10 of the terminal device.

The capacitive touch panel enabling unit 2 is configured to enable the capacitive touch panel 22 through the capacitive touch panel driving unit 21 in the kernel system of the terminal device. After receiving the ranging request, the hardware abstraction layer 10 of the terminal device will respectively enable the capacitive touch panel 22 of the terminal device and the proximity sensor driving unit 31 provided in the digital signal processor 30 of the terminal device. The capacitive touch panel 22 will switch to the working mode after receiving the enabling instruction.

The proximity sensor driving module enabling unit 3 is connected to the capacitive touch panel enabling unit 2, and the proximity sensor driving module enabling unit 3 is configured to send an enabling instruction to the proximity sensor driving unit 31 provided in the digital signal processor 30 of the terminal device.

The distance event receiving unit 4 is connected to the proximity sensor driving module enabling unit 3, and the distance event receiving unit 4 is configured to receive a distance event sent by the proximity sensor driving unit 31.

The distance information acquiring unit 5 is connected to the distance event receiving unit 4, and the distance information acquiring unit 5 is configured to acquire distance information between an object and the capacitive touch panel 22 through the capacitive touch panel driving unit 21.

The capacitive touch panel driving unit 21 is disposed in the kernel system 20. The proximity sensor driving unit 31 is disposed in the digital signal processor 30.

The capacitive touch panel driving unit 21 is connected to the capacitive touch panel enabling unit 2. The capacitive touch panel 22 is connected to the capacitive touch panel driving unit 21. The proximity sensor driving unit 31 is connected to the proximity sensor driving module enabling unit 3.

The advantage of the present application is that, by adding the processing unit to the hardware abstraction layer of the terminal device, the present application is used for establishing the communication channel between the capacitive touch panel driving module in the kernel system of the terminal device and the proximity sensor driving module in the digital signal processor of the terminal device. In addition, the terminal device also adds an external interrupt signal, so that the proximity sensor driving module in the digital signal processor of the terminal device can send the distance event in time. The present application can realize the replacement of the physical proximity sensor with the software method through the foregoing structural design and implementation of steps, thereby effectively reducing costs.

Figure 3:
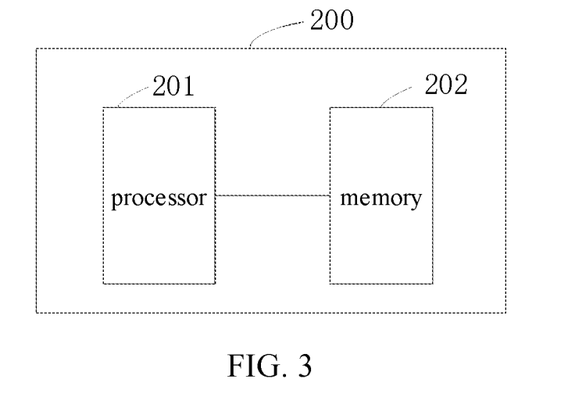
FIG. 3 is a schematic structural diagram of a terminal device provided by an embodiment of the present application.

As shown in FIG. 3, an embodiment of the present application further provides a terminal device, where the terminal device may be a smartphone, a tablet computer, or other devices. Specifically, as shown in FIG. 3, the terminal device 200 includes a processor 201 and a memory 202. The processor 201 is electrically connected to the memory 202.

The processor 201 is a control center of the terminal device 200 and is connected to various parts of the terminal device using various interfaces and lines. By running or loading applications stored in the memory 202 and invoking data stored in the memory 202, the processor 201 executes various functions of the terminal device and performs data processing, thereby performing an overall monitoring on the terminal device.

In this embodiment, the terminal device 200 is provided with multiple storage partitions, and the multiple storage partitions include a system partition and a target partition. The processor 201 in the terminal device 200 loads instructions corresponding to processes of one or more applications into the memory 202 in the following steps, and the processor 201 runs the applications stored in the memory 202 so as to implement various functions:

enabling a capacitive touch panel of the terminal device through a capacitive touch panel driving module in a kernel system of the terminal device;

sending an enabling instruction to a proximity sensor driving module provided in a digital signal processor of the terminal device;

receiving a distance event sent by the proximity sensor driving module; and acquiring distance information of an object and the capacitive touch panel through the capacitive touch panel driving module.

Figure 4:
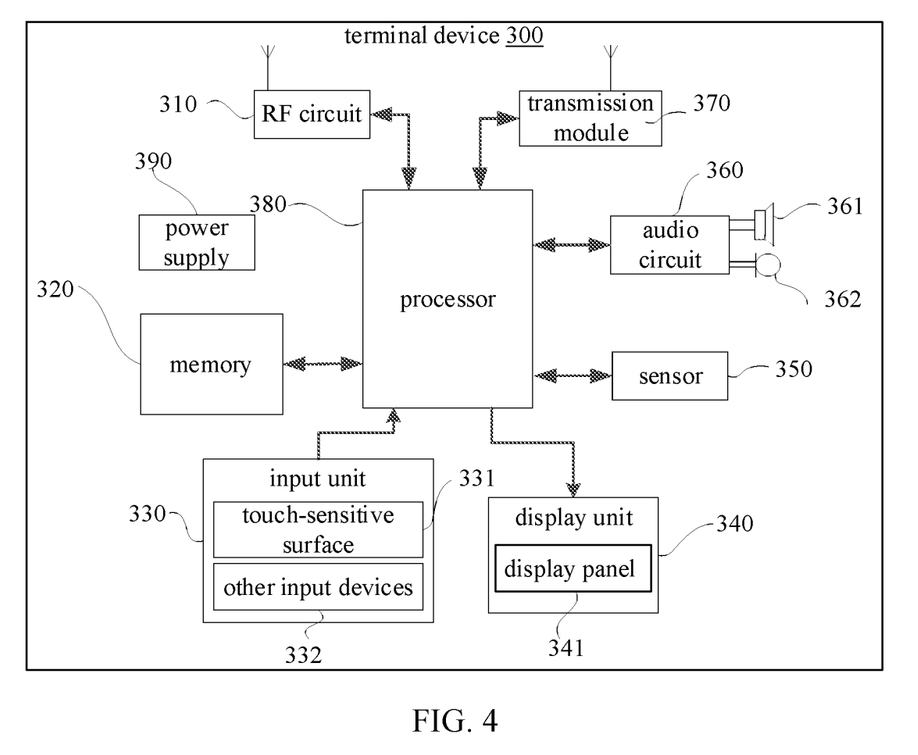
FIG. 4 is another schematic structural diagram of the terminal device provided by an embodiment of the present application.

FIG. 4 shows a specific structural block diagram of a terminal device provided by an embodiment of the present disclosure, and the terminal device can be used to implement the ranging method provided in the foregoing embodiments. The terminal device 300 may be a smart phone or a tablet computer. The terminal device 300 may include a radio frequency (RF) circuit 310, a memory 320 having one or more (only one shown in the figure) computer-readable storage media, an input unit 330, a display unit 340, an audio circuit 360, a transmission module 370, and a processor 380 having one or more (only one shown in the figure) processing cores.

The radio frequency (RF) circuit 310 may be configured to receive and transmit electromagnetic waves and to realize mutual conversions of the electromagnetic waves and electrical signals, thereby communicating with a communication network or any other devices. The RF circuit 310 may include various existing circuit elements used for performing these functions, for example, an antenna, a radio frequency transceiver, a digital signal processor, an encryption/decryption chip, a subscriber identification module (SIM) card, a memory, and the like. The RF circuit 310 may communicate with various networks, for example, an internet, an intranet, or a wireless network, or may communicate with any other devices via a wireless network. The foregoing wireless network may include a cellular telephone network, a wireless local area network, or a metropolitan area network. The foregoing wireless network may use various communication standards, protocols, and technologies and may include but not limited to, Global System of Mobile Communication (GSM), Enhanced Data GSM Environment (EDGE), wideband code-division multiple access (WCDMA), code-division multiple access (CDMA), time-division multiple access (TDMA), Wireless Fidelity (WI-FI, for example, Institute of Electrical and Electronics Engineers (IEEE) 802.11a, IEEE 802.11b, IEEE 802.11g and/or IEEE 802.11n), Voice over Internet Protocol (VoIP), Worldwide Interoperability for Microwave Access (Wi-MAX), other protocols for E-mail, instant messaging, and Short Messaging Service (SMS), and other suitable communication protocols, and may even include protocols which are not developed currently.

The memory 320 may be configured to store software programs and modules, for example, the program instructions/modules corresponding to the ranging method in accordance with the foregoing embodiments. The processor 380 performs a variety of functional applications and data processing (that is, to achieve the functions of ranging method) by executing the software programs and the modules stored in the memory 320. The memory 320 may include a high speed random access memory, and may further include a nonvolatile memory, such as one or more of a magnetic disk storage device, a flash memory, or other non-volatile solid state storage devices. In some instances, the memory 320 may further include memory remotely located relative to the processor 380, and such remote memory can be connected to the terminal device 300 via a network. Examples of the network include, but are not limited to, an internet, an intranet, a local area network, a mobile communication network, and any combinations thereof.

The input unit 330 may be configured to receive numeric or character information inputted and to generate input signals of a keyboard, a mouse, a lever, an optical device, or a trackball related to user settings and functional controls. Specifically, the input unit 330 may include a touch-sensitive surface 331 and other input devices 332. The touch-sensitive surface 331, also known as a touch display or a trackpad, collects touch operations of users on or near the surface, such as operations on the touch-sensitive surface 331 or near the touch-sensitive surface 331 triggered by theusers using a finger, stylus, or any suitable object or accessory, and drives a corresponding device connected therewith according to a preset program. The touch-sensitive surface 331 can optionally include two parts: a touch detection device and a touch controller. Wherein, the touch detection device detects touch locations and directions of the users, detects signals generated by touch operations, and transmits the signals to the touch controller. The touch controller receives touch signals from the touch detection device, converts the touch signals into contact coordinates, and sends the contact coordinates to the processor 380, and can receive and execute commands from the processor 380. Additionally, the touch-sensitive surface 331 can be implemented by various types of resistive, capacitive, infrared, and surface acoustic wave touch-sensitive surfaces. In addition to the touch-sensitive surface 331, the input unit 330 can also include the other input devices 332. Specifically, the other input devices 332 may include, but are not limited to, one or more of physical keyboards, function keys such as volume control keys, switching keys, etc., trackballs, mice, levers, and the like.

The display unit 340 may be configured to display information input by users or presented the information to the users as well as to various graphical user interfaces (GUIs) of the terminal device 300, which can include graphics, texts, icons, videos, and any combinations thereof. The display unit 340 may include a display panel 341, which may be optionally configured with forms of a liquid crystal display (LCD), an organic light-emitting diode (OLED), etc. Further, the touch-sensitive surface 331 can cover the display panel 341. When detecting the touch operations on surface or the touch operations in proximity, the touch-sensitive surface 331 transmits the detected operations to the processor 380 to determine a type of a touch event. The processor 380 provides a corresponding visual output on the display panel 341 according to the type of the touch event. Although the touch-sensitive surface 331 and the display panel 341 in FIG. 4 are used as two separate components to implement input and output functions, in some embodiments, the touch-sensitive surface 331 can be integrated with the display panel 341 to implement the input and output functions.

The terminal device 300 may also include at least one sensor 350, such as an optical sensor, a motion sensor, and a sensor of other types. Specifically, the optical sensor may include an ambient light sensor and a proximity sensor. Wherein, the ambient light sensor can adjust brightness of the display panel 341 according to brightness and darkness of ambient light. The proximity sensor can turn off the display panel 341 and/or backlight when the terminal device 300 moves near an ear. As a type of a motion sensor, a gravity acceleration sensor can detect magnitude of acceleration in all directions, generally three axes, and detect a level and a direction of gravity at rest. The gravity acceleration sensor can be used in applications of identifying mobile phone orientation, such as vertical and horizontal screen switching, games, and magnetometer calibration, applications of vibration recognition related functions, such as pedometers and tapping. The terminal device 300 can also be configured with gyroscopes, barometers, hygrometers, thermometers, infrared sensors, and other sensors, and details are not described here.

The audio circuit 360, a speaker 361, and a microphone 362 can provide an audio interface between a user and the terminal device 300. The audio circuit 360 can receive electrical signals converted from audio data and transmit received electrical signals to the speaker 361. The speaker 361 converts the electrical signals to sound signals for output. On another hand, the microphone 362 converts collected sound signals into electrical signals, which are received and converted by the audio circuit 360 into audio data. The audio data is output to the processor 380 for processing and is sent to, for example, another terminal device through the RF circuit 310. Alternatively, the audio data is output to the memory 320 for further processing. The audio circuit 360 may also include a headset jack for communicationally interfacing a peripheral headset and the terminal device 300.

The terminal device 300 facilitates a user to send and receive e-mail, browse the web, and access streaming media via the transmission module 370, such as a WI-FI module, which provides the user with wireless broadband Internet access. Although FIG. 4 shows the transmission module 370, it may be understood that the transmission module 370 is not an essential component of the terminal device 300, and can be optionally omitted without changing the nature and scope of this disclosure.

The processor 380 is a control center of the terminal device 300 and is connected to various parts of the phone by using various interfaces and lines. By running or executing a software program and/or module stored in the memory 320 and invoking data stored in the memory 320, the processor 380 executes various functions of the terminal device and performs data processing, thereby performing an overall monitoring on a cell phone. The processor 380 may optionally include one or more processing cores. In some embodiments, the processor 380 may integrate an application processor and a modem processor. The application processor mainly processes an operating system, a user interface, an application program, and the like. The modem processor mainly processes wireless communication. It may be understood that the foregoing modem processor may alternatively not be integrated into the processor 380.

The terminal device 300 further includes a power supply 390, such as batteries, for supplying power to various components. In some embodiments, the power supply may be logically connected to the processor 380 by a power management system, thereby implementing management functions such as charging, discharging, and power consumption management by the power management system. The power supply 390 may further include one or more of a direct current (DC) or alternate current (AC) power supply, a re-charging system, a power fault detection circuit, a power converter or inverter, a power state indicator, or any other components.

Although not shown in the figure, the terminal device 300 may further include a camera, such as a front camera and a rear camera, a BLUETOOTH module, etc., and details are not further described here. Specifically, in this embodiment, the display unit of the terminal device is a touch screen display. The terminal device further includes memory as well as one or more programs, one or more of which are stored in the memory. The one or more programs configured to be executed by one or more processors contain instructions for performing following operations of:

enabling a capacitive touch panel of the terminal device through a capacitive touch panel driving module in a kernel system of the terminal device;

sending an enabling instruction to a proximity sensor driving module provided in a digital signal processor of the terminal device;

receiving a distance event sent by the proximity sensor driving module; and acquiring a distance information of an object and the capacitive touch panel through the capacitive touch panel driving module.

In a specific implementation, the above modules may be implemented as independent entities, or may be arbitrarily combined, to implement as a same or several entities. For the specific implementation of the above modules, the above method embodiments may be referred to, which will not be further described here again.

A person of ordinary skill in the art could understand that, all or some steps of various methods in the embodiments may be implemented through instructions, or implemented through hardware related to instructions control, and the instructions may be stored in a computer-readable storage medium and loaded and executed by a processor.

To this end, an embodiment of this application provides a storage medium storing a plurality of instructions therein, and the instructions are suitable to be loaded by the processor to perform the steps in any ranging method according to the embodiments of this application.

The storage medium may include: a read-only memory (ROM), a random access memory (RAM), a magnetic disk, an optical disc, or the like.

Since the instructions stored in the storage medium may perform the steps of any ranging method in the embodiments of this disclosure, the instructions can achieve beneficial effects that may be achieved by any ranging method in the embodiments of this disclosure. For details, reference may be made to the foregoing embodiments. Details are not further described here.

For a specific implementation of each of the foregoing operations, reference may be made to the foregoing embodiments. This is not further described here again.

To sum up, although the present application has been disclosed in terms of the preferred embodiment, the foregoing preferred embodiment is not intended to limit the present application. Those skilled in the art can make various changes and modifications without departing from the spirit and scope of the present application. Therefore, the scope of protection of the present application shall be as defined in the claims.

What is claimed is:

1. A ranging method, which is applicable to a terminal device, wherein the method comprises following steps:
enabling a capacitive touch panel of the terminal device through a capacitive touch panel driving module in a kernel system of the terminal device, wherein the capacitive touch panel driving module is controlled by a capacitive touch panel driving program;
receiving a ranging request;
sending an enabling instruction to a proximity sensor driving module provided in a digital signal processor of the terminal device, wherein the proximity sensor driving module is controlled by a proximity sensor driving program;
receiving a distance event sent by the proximity sensor driving module; and
acquiring distance information of an object and the capacitive touch panel through the capacitive touch panel driving module.

2. The ranging method as claimed in claim 1, wherein after the step of sending the enabling instruction to the proximity sensor driving module provided in the digital signal processor of the terminal device and before the step of receiving the distance event sent by the proximity sensor driving module, the method further comprises steps of: detecting the distance event by the capacitive touch panel; and sending an interrupt signal to the capacitive touch panel driving module by the capacitive touch panel.

3. The ranging method as claimed in claim 2, wherein after the step of sending the interrupt signal to the capacitive touch panel driving module by the capacitive touch panel, the method further comprises: sending a pulse signal having a preset duration to the proximity sensor driving module by the capacitive touch panel driving module.

4. The ranging method as claimed in claim 3, wherein the preset duration is 1 ms-20 ms.

5. The ranging method as claimed in claim 1, wherein after the step of acquiring the distance information of the object and the capacitive touch panel through the capacitive touch panel driving module, the method further comprises: reporting a determination result to the terminal device according to the distance information.

6. A non-transitory computer-readable storage medium, wherein a plurality of instructions are stored in the storage medium, and the instructions are adapted to be loaded by a processor to execute a ranging method; the ranging method comprises:
enabling a capacitive touch panel of a terminal device through a capacitive touch panel driving module in a kernel system of the terminal device, wherein the capacitive touch panel driving module is controlled by a capacitive touch panel driving program;
receiving a ranging request;
sending an enabling instruction to a proximity sensor driving module provided in a digital signal processor of the terminal device, wherein the proximity sensor driving module is controlled by a proximity sensor driving program;
receiving a distance event sent by the proximity sensor driving module; and
acquiring distance information of an object and the capacitive touch panel through the capacitive touch panel driving module.

7. The non-transitory computer-readable storage medium as claimed in claim 6, wherein after the step of sending the enabling instruction to the proximity sensor driving module provided in the digital signal processor of the terminal device and before the step of receiving the distance event sent by the proximity sensor driving module, the method further comprises steps of: detecting the distance event by the capacitive touch panel; and sending an interrupt signal to the capacitive touch panel driving module by the capacitive touch panel.

8. The non-transitory computer-readable storage medium as claimed in claim 6, wherein after the step of sending the interrupt signal to the capacitive touch panel driving module by the capacitive touch panel, the method further comprises: sending a pulse signal having a preset duration to the proximity sensor driving module by the capacitive touch panel driving module.

9. The non-transitory computer-readable storage medium as claimed in claim 8, wherein the preset duration is 1 ms-20 ms.

10. The non-transitory computer-readable storage medium as claimed in claim 9, wherein after the step of acquiring the distance information of the object and the capacitive touch panel through the capacitive touch panel driving module, the method further comprises: reporting a determination result to the terminal device according to the distance information.

11. A terminal device, comprising a processor and a memory, the processor is electrically connected to the memory, the memory is configured to store instructions and data, and the processor is configured to implement steps in a ranging method, and the ranging method comprises following steps:
- enabling a capacitive touch panel of the terminal device through a capacitive touch panel driving module in a kernel system of the terminal device, wherein the capacitive touch panel driving module is controlled by a capacitive touch panel driving program;
- receiving a ranging request;
- sending an enabling instruction to a proximity sensor driving module provided in a digital signal processor of the terminal device, wherein the proximity sensor driving module is controlled by a proximity sensor driving program;
- receiving a distance event sent by the proximity sensor driving module; and
- acquiring distance information of an object and the capacitive touch panel through the capacitive touch panel driving module.

12. The terminal device as claimed in claim 11, wherein after the step of sending the enabling instruction to the proximity sensor driving module provided in the digital signal processor of the terminal device and before the step of receiving the distance event sent by the proximity sensor driving module, the method further comprises steps of: detecting the distance event by the capacitive touch panel; and sending an interrupt signal to the capacitive touch panel driving module by the capacitive touch panel.

13. The terminal device as claimed in claim 11, wherein after the step of sending the interrupt signal to the capacitive touch panel driving module by the capacitive touch panel, the method further comprises: sending a pulse signal having a preset duration to the proximity sensor driving module by the capacitive touch panel driving module.

14. The terminal device as claimed in claim 13, wherein the preset duration is 1 ms-20 ms.

15. The terminal device as claimed in claim 14, wherein after the step of acquiring the distance information of the object and the capacitive touch panel through the capacitive touch panel driving module, the method further comprises: reporting a determination result to the terminal device according to the distance information.

\* \* \* \* \*